United States Patent [19]

Legvold et al.

[11] Patent Number: 5,375,232
[45] Date of Patent: Dec. 20, 1994

[54] METHOD AND SYSTEM FOR ASYNCHRONOUS PRE-STAGING OF BACKUP COPIES IN A DATA PROCESSING STORAGE SUBSYSTEM

[75] Inventors: Vernon J. Legvold; William F. Micka, both of Tucson, Ariz.; Kenneth M. Nagin, Haifa, Israel; Yoram Novick, Haifa, Israel; Pnina A. Vortman, Haifa, Israel; Elfraim Zeidner, Kiryat Chaim, Israel

[73] Assignee: International Business Machines Corporation, Armonk, N.Y.

[21] Appl. No.: 949,665

[22] Filed: Sep. 23, 1992

[51] Int. Cl.⁵ .............................................. G06F 11/00
[52] U.S. Cl. .................................. 395/575; 395/250
[58] Field of Search .................. 395/575, 600, 250; 364/270.5, 270.6

[56] References Cited

U.S. PATENT DOCUMENTS 5,263,154 11/1993 Eastridge et al. ............... 395/575
5,276,876 1/1994 Coleman et al. ................. 395/650

Primary Examiner—Vincent P. Canney
Attorney, Agent, or Firm—H. St. Julian

[57] ABSTRACT

A method and system are disclosed for transferring a backup copy of designated datasets stored in a plurality of storage subsystems to a host system via a data channel during concurrent execution of an application. Upon receiving a request for a backup copy, execution of an application is temporarily suspended. A dataset logical-to-physical storage system address concordance for the designated datasets is formed and execution of the application is resumed thereafter. Any application initiated updates to affected portions of the designated datasets which occur prior to generation of a backup copy of the affected portions of the datasets are processed by buffering the updates, copying the affected portions to storage subsystem memory, updating the address concordance and writing the updates to the affected portions of the dataset. The remaining portions of the designated datasets are then copied to storage system memory from the storage subsystem on an asynchronous basis and an attention signal is transmitted to the host system when a lower threshold level is achieved. If an upper threshold level within the storage subsystem memory is achieved, the asynchronous copying of the designated datasets is temporarily suspended. The stored portions of the designated datasets are then transferred from storage subsystem memory to the host system at channel speeds, greatly enhancing the efficiency of data transfer.

8 Claims, 6 Drawing Sheets

METHOD AND SYSTEM FOR ASYNCHRONOUS PRE-STAGING OF BACKUP COPIES IN A DATA PROCESSING STORAGE SUBSYSTEM

CROSS-REFERENCE TO RELATED APPLICATIONS

The present application is related to U.S. patent application Ser. No. 07/781,044, entitled "Method and Means For Time Zero Backup Copying of Data," filed Oct. 18, 1991, and assigned to the assignee herein named and U.S. patent application Ser. No. 07/871,787, entitled "A Method and System for Automated Backup Copy Ordering in a Time Zero Backup Copy Session," filed Apr. 20, 1992, and assigned to the assignee herein named. The contents of these cross-referenced U.S. patent applications are hereby incorporated herein by reference thereto.

BACKGROUND OF THE INVENTION

1. Technical Field

The present invention relates in general to methods and systems for improved maintenance of backup copies of datasets in a data processing system and in particular to improved methods and systems for transferring backup copies of datasets in a data processing system. Still more particularly, the present invention relates to methods and systems for asynchronous pre-staging of backup copies in a data processing storage subsystem.

2. Description of the Related Art

A modern data processing system must be prepared to recover, not only from corruptions of stored data which occur as a result of noise bursts, software bugs, media defects, and write path errors, but also from global events, such as data processing system power failure. The most common technique of ensuring the continued availability of data within a data processing system is to create one or more copies of selected datasets within a data processing system and store those copies in a nonvolatile environment. This so-called "backup" process occurs within state-of-the-art external storage systems in modern data processing systems.

Backup policies are implemented as a matter of scheduling. Backup policies have a space and time dimension which is exemplified by a range of datasets and by the frequency of backup occurrence. A FULL backup requires the backup of an entire range of a dataset, whether individual portions of that dataset have been updated or not. An INCREMENTAL backup copies only that portion of the dataset which has been updated since a previous backup, either full or incremental. The backup copy thus created represents a consistent view of the data within the dataset as of the time the copy was created.

Of course, those skilled in the art will appreciate that as a result of the process described above, the higher the backup frequency, the more accurately the backup copy will mirror the current state of data within a dataset. In view of the large volumes of data maintained within a typical state-of-the-art data processing system backing up that data is not a trivial operation. Thus, the opportunity cost of backing up data within a dataset may be quite high on a large multi-processing, multi-programming facility, relative to other types of processing.

Applications executed within a central processing system are in either a batch (streamed) or interactive (transactional) mode. In a batch mode, usually one application is executed at a time without interruption. Interactive mode is characterized by interrupt driven multiplicity of applications or transactions.

When a data processing system is in the process of backing up data in a batch mode system, each process, task or application within the data processing system is affected. That is, the processes supporting the batch mode operations are suspended for the duration of the copying. Those skilled in the art will recognize that this event is typically referred to as the "backup window." In contrast to batch mode operations, log based or transaction management applications are processed in the interactive mode. Such transaction management applications eliminate the "backup window" by concurrently updating an on-line dataset and logging the change. However, this type of backup copying results in a consistency described as "fuzzy." That is, the backup copy is not a precise "snapshot" of the state of a dataset/database at a single point in time. Rather, a log comprises an event file requiring further processing against the database.

A co-pending U.S. patent application Ser. No. 07/385,647, filed Jul. 25, 1989, entitled A Computer Based Method for Dataset Copying Using An Incremental Backup Policy, illustrates backup in a batch mode system utilizing a modified incremental policy. A modified incremental policy copies only new data or data updates since the last backup. It should be noted that execution of applications within the data processing system are suspended during copying in this system.

As described above to establish a prior point of consistency in a log based system, it is necessary to "repeat history" by replaying the log from the last check point over the datasets or database of interest. The distinction between batch mode and log based backup is that the backup copy is consistent and speaks as of the time of its last recordation, whereas the log and database mode require further processing in the event of a fault in order to exhibit a point in time consistency.

U.S. Pat. No. 4,507,751, Gawlick et al., entitled Method and Apparatus For Logging Journal Data Using A Write Ahead Dataset, issued Mar. 25, 1985, exemplifies a transaction management system wherein all transactions are recorded on a log on a write-ahead dataset basis. As described within this patent, a unit of work is first recorded on the backup medium (log) and then written to its external storage address.

Co-pending U.S. patent application Ser. No. 07/524,206, filed May 16, 1990, entitled Method and Apparatus for Executing Critical Disk Access Commands, teaches the performance of media maintenance on selected portions of a tracked cyclic operable magnetic media concurrent with active access to other portions of the storage media. The method described therein requires the phased movement of customer data between a target track to an alternate track, diversion of all concurrent access request to the alternate track or tracks and the completion of maintenance and copy back from the alternate to the target track.

Requests and interrupts which occur prior to executing track-to-track customer data retirement result in the restarting of the process. Otherwise, requests and interrupts occurring during execution of the data movement view a DEVICE BUSY state. This typically causes a re-queuing of the request.

The cross-referenced patents applications set forth herein describe a so-called "time zero" backup copy system wherein execution of an application is suspended for a minimum period of time for purposes of creating a backup copy. In such a system, backup copies are created by first creating a dataset logical-to-physical storage system address concordance for designated datasets and thereafter resuming execution of the application. Formation of the backup copy is then accomplished on a scheduled or opportunistic basis by copying the designated datasets from the storage subsystems to the host and then updating the address concordance in response to such copying. Application driven updates to uncopied designated datasets are processed by first buffering those updates, copying the affected uncopied designated datasets to a storage subsystem memory, updating the address concordance in response to that copying and then processing the updates. In this manner, execution of an application is suspended for a minimal period of time necessary to create the logical-to-physical storage system address concordance and copies of portions of the designated dataset are only created for those portions which are updated prior to copying.

While this time zero backup copy system represents a substantial improvement over the prior art, the transfer of large amounts of data from a storage subsystem to a host system for backup copying purposes still requires a substantial commitment of system assets. This is especially true during a transfer of designated portions of the dataset from a storage subsystem to a host system which is limited by the speed of the storage device. Typically, the transfer rate of data from a storage device is 4.2 megabytes per second. The data channels utilized to couple storage subsystems to host systems now commonly utilize serial optical data technology which is capable of transferring data at up to 17 megabytes per second. Thus, transfer of data between a storage subsystem device and a host system for backup copy purposes would be greatly enhanced if that data can be transferred from memory within a storage system controller to the host system directly. Certain state-of-the-art storage system control units permit sequential processing of data; however, no provision is made in such systems for discerning the order in which the host system desires to transfer the data and such systems provide no technique whereby the pre-staging of data within storage system memory may be coordinated with attempts by the host system to read that data.

Thus, it should be apparent that a need exists for a method and system which permits the asynchronous pre-staging of backup copy data in a data processing storage subsystem in a manner which greatly enhances the transfer of backup copy data to a host system.

SUMMARY OF THE INVENTION

It is therefore one object of the present invention to provide an improved method and system for the maintenance of backup copies of datasets in a data processing system.

It is another object of the present invention to provide an improved method and system for transferring backup copies of datasets in a data processing system.

It is yet another object of the present invention to provide an improved method and system for asynchronous pre-staging of backup copies of datasets in a data processing storage subsystem.

The foregoing objects are achieved as is now described. A method and system are disclosed for transferring a backup copy of designated datasets stored in a plurality of storage subsystems to a host system via a data channel during concurrent execution of an application. Upon receiving a request for a backup copy, execution of an application is temporarily suspended. A dataset logical-to-physical storage system address concordance for the designated datasets is formed and execution of the application is resumed thereafter. Any application initiated updates to affected portions of the designated datasets which occur prior to generation of a backup copy of the affected portions of the datasets are processed by buffering the updates, copying the affected portions to storage subsystem memory, updating the address concordance and writing the updates to the affected portions of the dataset. The remaining portions of the designated datasets are then copied to storage system memory from the storage subsystem on an asynchronous basis and an attention signal is transmitted to the host system when a lower threshold level is achieved. If an upper threshold level within the storage subsystem memory is achieved, the asynchronous copying of the designated datasets is temporarily suspended. The stored portions of the designated datasets are then transferred from storage subsystem memory to the host system at channel speeds without the delays generally associated with device orientation, greatly enhancing the efficiency of data transfer.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
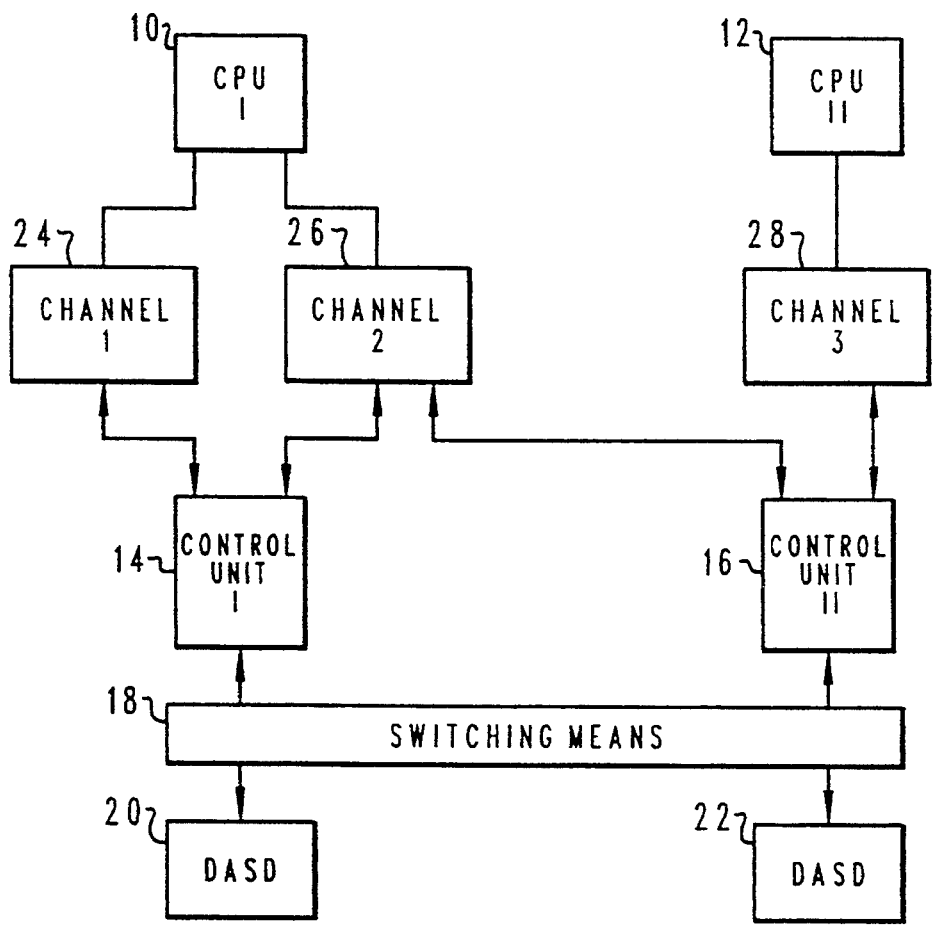
FIG. 1 illustrates a prior art multi-processing multi-programming environment wherein executing processes and applications randomly or sequentially access data from external storage.

With reference to the figures and in particular with reference to FIG. 1, a prior art multi-processing multi-programming environment is illustrated where executing processes and applications randomly or sequentially access data from external storage. Such systems include a plurality of central processing units 10, 12 which access external storage subsystems 14, 16, 18, 20, 22 over redundant channel demand and response interfaces 24, 26, 28.

The illustrated embodiment in FIG. 1 may be provided in which each processor within the data processing system is implemented utilizing an IBM/360 or 370 architected processor type having, as an example, an IBM MVS operating system. An IBM/360 architected processor is fully described in Amdahl et al., U.S. Pat. No. 3,400,371, entitled Data Processing System, issued on Sep. 3, 1968. A configuration in which multiple processors share access to external storage units is set forth in Luiz et al., U.S. Pat. No. 4,207,609, entitled Path Independent Device Reservation and Reconnection in a Multi-CPU and Shared Device Access System, issued Jan. 10, 1980.

The MVS operating system is also described in IBM Publication GC28-1150, entitled MVS/Extended Architecture System Programming Library: System Macros and Facilities, Vol. 1. Details of standard MVS or other operating system services, such as local lock management, subsystem invocation by interrupt or monitor, and the posting and waiting of tasks is omitted. These operating systems services are believed to be well known to those having skill in this art.

Still referring to FIG. 1, as described in Luiz et al., a processor process may establish a path to externally stored data in an IBM System 370 or similar system through an MVS or other known operating system by invoking a START I/O, transferring control to a channel subsystem which reserves a path to the data over which transfers are made. Typically, executing applications have data dependencies and may briefly suspend operations until a fetch or update has been completed. During such a transfer, the path is locked until the transfer is completed.

Figure 2:
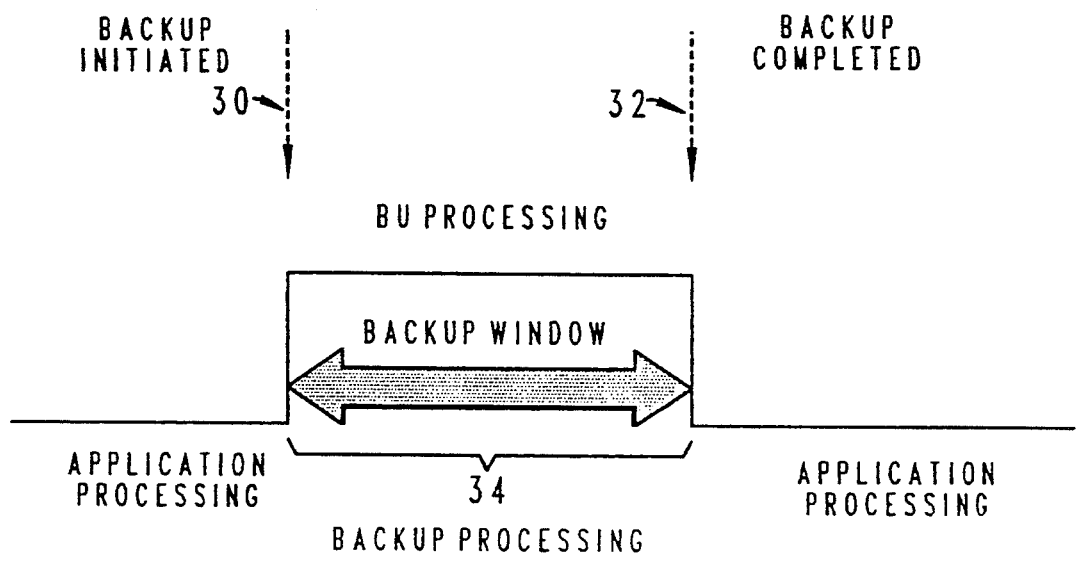
FIG. 2 illustrates a time line depiction of a backup process according to the prior art.

Referring to FIG. 2, a time line depiction of the backup process according to the prior art is illustrated. At a first time 30 a backup copy is initiated and applications are suspended or shut down. The suspension continues until the backup copy is completed at a second time 32. Termination of the backup process signifies that all the data specified for backup copy has been read from the source and written to an alternate storage memory. As can be seen, the backup window 34 spans the time from initiation of the backup copy to termination of the backup copy process.

Figure 3:
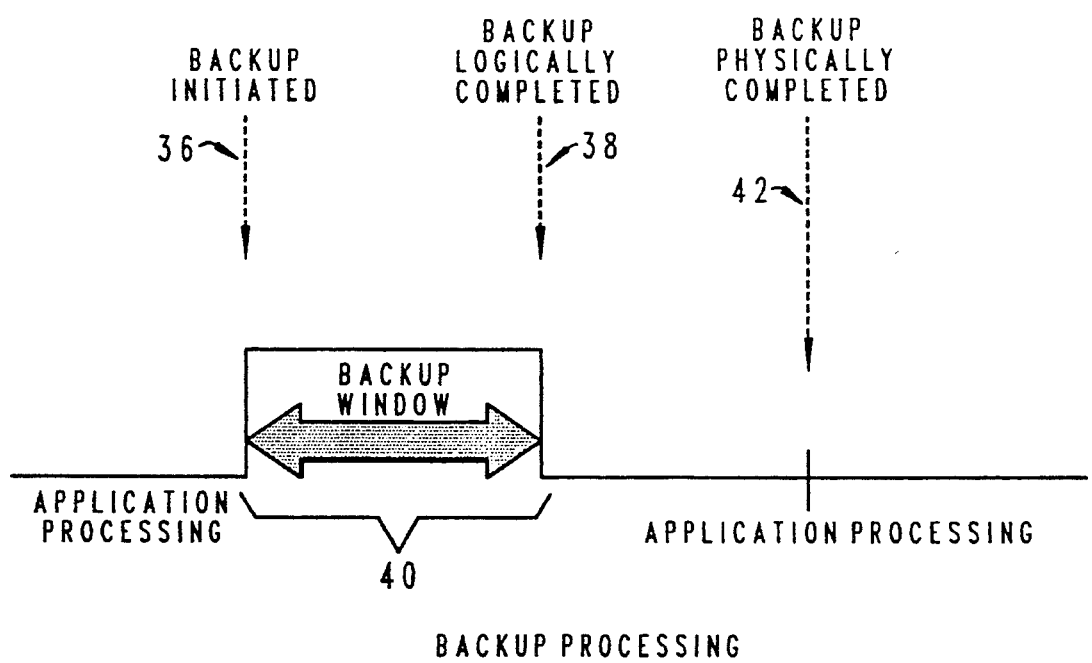
FIG. 3 illustrates a time line depiction of a time zero backup process as described in the cross-referenced patent applications.

FIG. 3 illustrates a time line depiction of a time zero backup process as described in the cross-referenced patent applications. At a first time 36 the backup copy process is initiated and execution of an application is suspended or shut down. Time 36 is known as "time zero," which means this is the time at which the snapshot of the state of the datasets is taken. As will be described below, the datasets are frozen at that point in time as far as the backup copy process is concerned.

At a second time 38 the backup copy is "logically completed," meaning each track within the datasets to be copied has been identified and mapped in a bitmap, and execution of the application resumes. The datasets can now be used and updated by the application. As can be seen, the backup window 40 is significantly reduced, and is typically measured in milliseconds. Some time later, at a third time 42, the backup copy process is physically completed, meaning all datasets specified for backup copy have been read from the source and written to an alternative storage memory.

Figure 4:
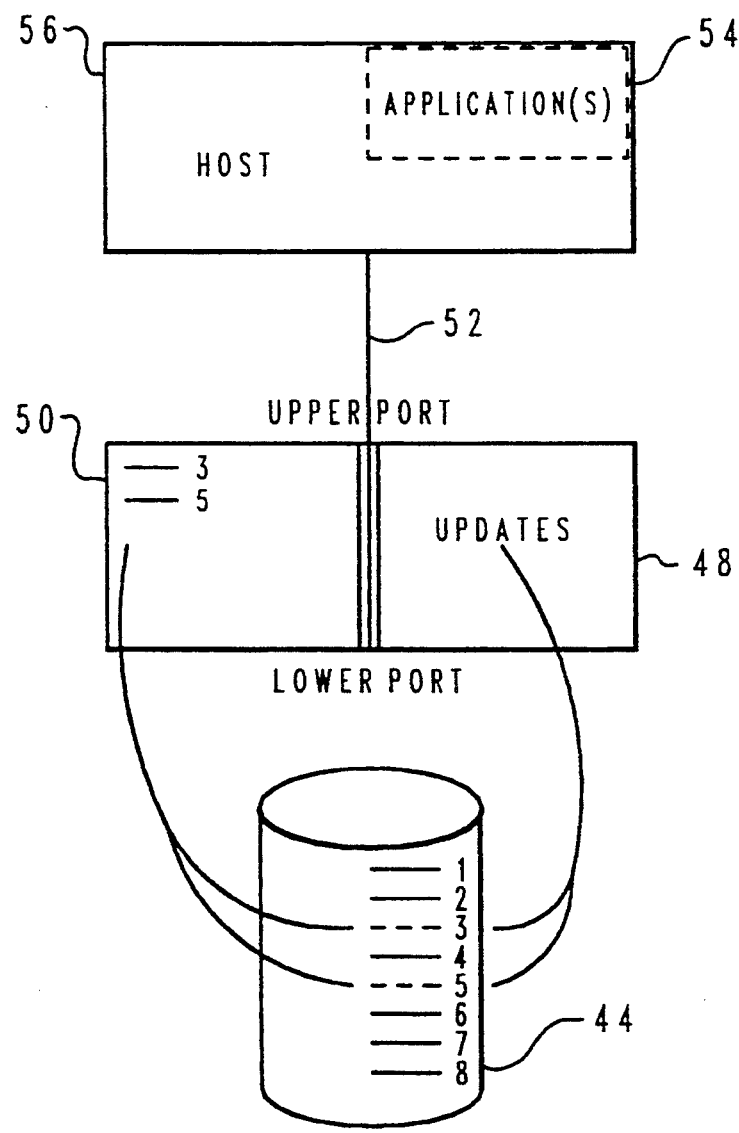
FIG. 4 is a pictorial representation of a method and system for generating and transferring a backup copy in accordance with the method and system of the present invention.

Referring now to FIG. 4, there is depicted a pictorial representation of a method and system for generating and transferring a backup copy of designated datasets in accordance with the method and system of the present invention. As illustrated, a time zero backup copy of data within a track cyclic storage device 44 may be created. As those skilled in the art will appreciate, data stored within such a device is typically organized into records and datasets. The real address of data within external storage is generally expressed in terms of Direct Access Storage Device (DASD) volumes, cylinders and tracks. The virtual address of such data is generally couched in terms of base addresses and offsets and/or extents from such base addresses.

Further, a record may be of the count-key-data format. A record may occupy one or more units of real storage. A "dataset" is a logical collection of multiple records which may be stored on contiguous units of real storage or which may be dispersed. Therefore, those skilled in the art will appreciate that if backup copies are created at the dataset level it will be necessary to perform multiple sorts to form inverted indices into real storage. For purposes of this explanation, backup processing will be described as managed primarily at the host and storage control unit level.

As illustrated, access to tracked cyclic storage device 44 by host 56 is typically accomplished utilizing a storage subsystem controller 48. Storage subsystem controller 48 may be implemented utilizing, for example, the Model 3990 Storage Subsystem Controller manufactured by International Business Machines Corporation. As illustrated, storage subsystem controller 48 includes a lower port for transferring data between tract cyclic storage device 44 and storage subsystem controller 48 and an upper port which is utilized to transfer data between storage subsystem controller 48 and host 56. The connection between storage subsystem controller 48 and host 56 may be implemented utilizing a high speed optical data serial data channel 52 which may be implemented utilizing the "ESCON" system, manufactured by International Business Machines Corporation, capable of transferring data between host 56 and storage system controller 48 at up to 17 megabytes per second.

As further illustrated within FIG. 4, storage subsystem controller 48 preferably includes storage subsystem memory 50 which may be utilized, in accordance with the method and system of the present invention, to store copies of tracks copied from tracked cyclic storage device 44 which have been updated by application initiated updates prior to the physical completion of a backup copy of those records, as described in the cross-referenced patent applications. Thus, an update initiated by application(s) 54 within host 56 which is coupled to storage subsystem controller 48 via optical data serial data channel 52 may result in updates to tracks 3 and 5 within tracked cyclic storage device 44. In accordance with the time zero backup copy technique, those updates are buffered within storage system controller 48 copies of tracks 3 and 5 are then written to storage subsystem memory 50, the address concordance describing the dataset to be backed up is modified to indicate that these tracks have been copied, and the updates are then initiated.

While this technique represents a substantial advance over the prior art in that updates of a designated dataset may occur with a minimal interference with the execution of applications within host 56, the transfer of the remaining tracks within a designated dataset within tracked cyclic storage device 44 to host 56, is generally accomplished on a scheduled or opportunistic basis.

These tracks will be transferred from tracked cyclic storage device 44 to host 56 at device data transfer rates, typically 4.2 megabytes per second. Further, access to tracked cyclic storage device 44 by other host systems is restricted during that period of time and the efficiency of the data processing system is therefore somewhat diminished.

Certain existing storage subsystems and storage subsystem controllers posses the capability of sequential processing, which involves pre-staging of data; however, this sequential processing is limited to the pre-staging of data which is assumed to be transferred subsequent to a current transfer, utilizing some algorithm for purposes of this assumption. Sequential processing; however, does not greatly enhance the efficiency of the resultant data processing systems since the storage system control unit does not know with certainty which data will be read next, and any attempt by the host to read data during the pre-staging process will result in the nonavailability of that data and a lack of efficiency within the data channel. Further, an attempt by the host system to read the data prior to such pre-staging will result in a transfer of that data at device speeds and the pre-staging of that data will thus be rendered unnecessary.

In accordance with an important feature of the present invention, which will be explained in greater detail below, host 56 may initiate a transfer of designated datasets within tracked cyclic storage device 44 in an asynchronous manner utilizing the method and system of the present invention. Under this technique, the tracks within the designated dataset which have not been copied to subsystem memory as a result of the interception of an attempted update are pre-staged into storage subsystem memory 50 and an "attention" signal is transmitted to the host after a selected amount of data has been pre-staged. By initiating data transfer to host 56 utilizing this "attention" signal, host 56 will not attempt to read the data prior to completion of the pre-staging and subsequent transfer of the data from storage subsystem memory 52 to host 56 may be accomplished at the maximum data rate permitted by data channel 52. Further, an upper threshold is also provided within storage subsystem memory 50 and if the amount of data stored within storage subsystem memory 50 exceeds this upper threshold, pre-staging of tracks from tracked cyclic storage device 44 is temporarily halted, until such time as host 56 can upload the data from storage system memory 50 via data channel 52.

Figure 5A:
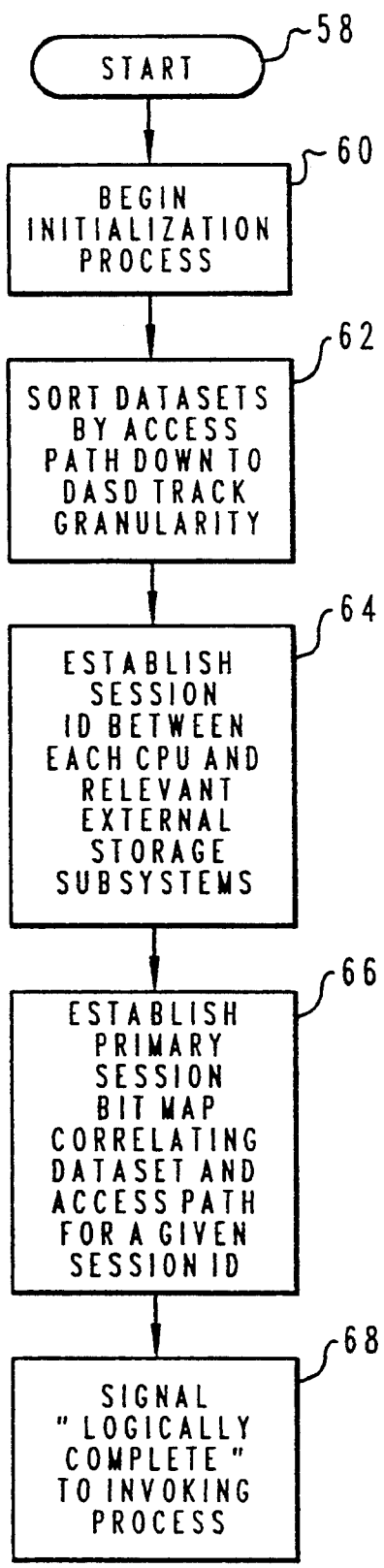
FIGS. 5a-5b are high level logic flowcharts which illustrate a method for generating a backup copy at the storage subsystem level in accordance with the method and system of the present invention.
Figure 5B:
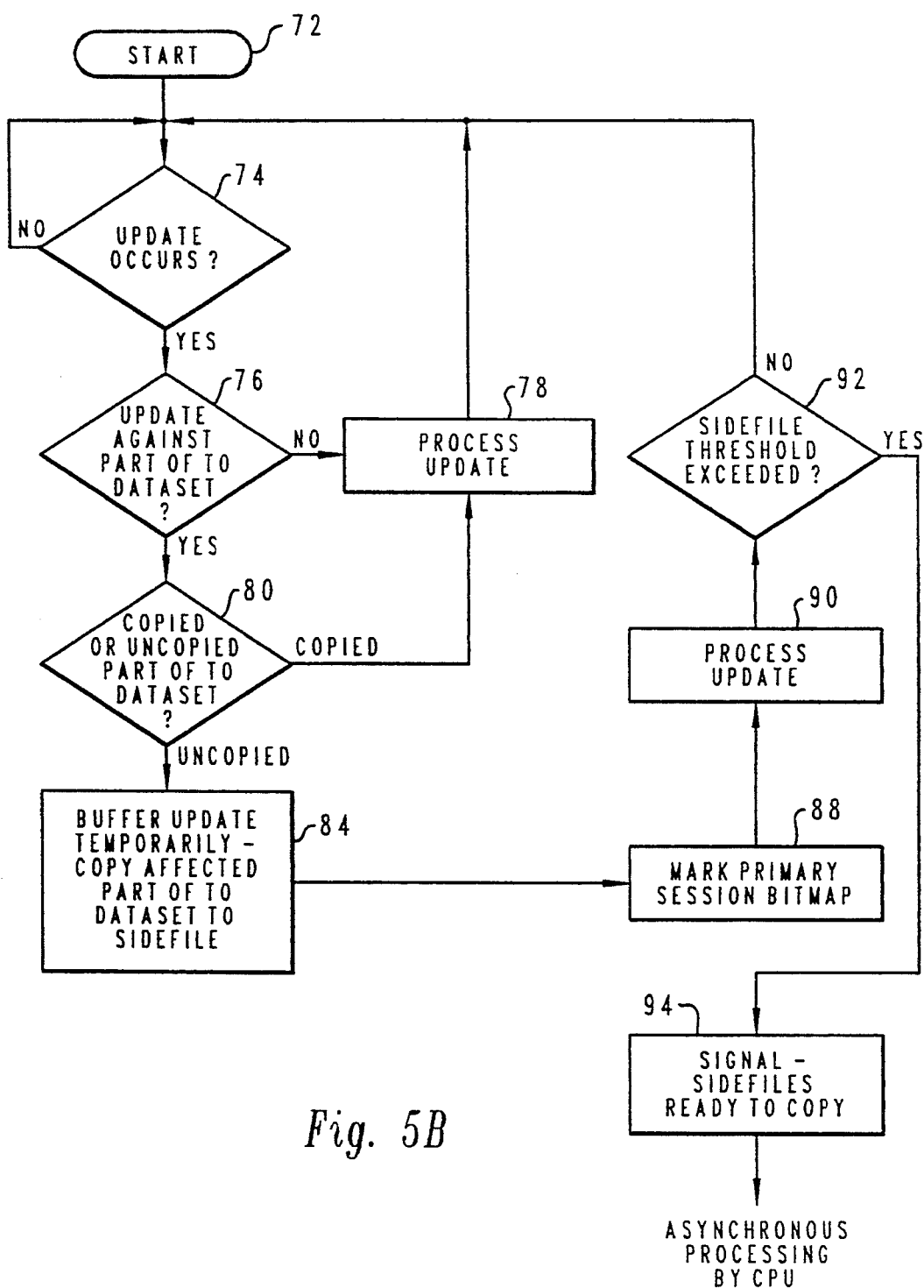

FIGS. 5a and 5b are high level logic flowcharts which illustrate a method for generating a backup copy at the storage subsystem level in accordance with the method and system of the present invention. Referring initially to FIG. 5a, the process begins at block 58 and thereafter passes to block 60 which illustrates the beginning of the initialization process. Thereafter, the process passes to block 62 which depicts the sorting of the datasets by access path, down to DASD track granularity. This sorting process will, necessarily, resolve an identification of the DASD volumes within which the datasets reside and the identification of the storage subsystems to which those volumes belong.

Next, as depicted at block 64, a session identification is established between each processor and the relevant external storage subsystems. The session identification is preferably unique across all storage subsystems, in order that multiple processors will not interfere with each others' backup copy processes. Thereafter, as illustrated at block 66, a primary session bit map is established which may be utilized, as set forth in detail herein and within the cross-referenced patent application, to indicate whether or not a particular track is part of the present copy session. Thereafter, as depicted at block 68, the "logically complete" signal is sent to the invoking process, indicating that application processing may continue; however, slight delays in updates will occur until such time as the backup copy is physically complete.

Referring to FIG. 5b, which illustrates the method for generating a backup copy at the storage subsystem level according to the present invention, the process begins at block 72 and thereafter passes to block 74. Block 74 illustrates a determination of whether or not an update has occurred. In the event no update has occurred, the process merely iterates until such time as an update does occur. In the event an update has occurred, the process passes to block 76. Block 76 illustrates a determination of whether or not the update initiated by an application within the data processing system is an update against a portion of the time zero dataset. If not, the process merely passes to block 78 and the update is processed in a user transparent fashion. However, in the event the update is against a portion of the time zero dataset, the process passes to block 80.

Block 80 illustrates a determination of whether or not the update is against a copied or uncopied portion of the time zero dataset. That is, an update to a portion of data within the dataset which has been copied to the backup copy and is therefore physically complete, or a portion which has not yet been copied to the backup copy. If the portion of the dataset against which the update is initiated has already been copied to the backup copy, the process passes to block 78 which illustrate the processing of the update. Again, the process then passes from block 78 to block 74, to await the occurrence of the next update.

Referring again to block 80, in the event the update against the time zero dataset is initiated against a portion of the time zero dataset which has not yet been copied to the backup copy, the process passes to block 84. Block 84 illustrates the temporary buffering of the update and the copying of the affected portion of the time zero dataset to the storage subsystem memory 50 (see FIG. 4). Thereafter, the process passes to block 88, which illustrates the marking of the primary session bit map, indicating that this portion of the dataset has been updated within the external storage subsystem and that the time zero copy of this portion of the dataset is now within storage subsystem memory 50.

After marking the primary session bit map, the process passes to block 90 which illustrates the processing of that update. Thereafter, the process passes to block 92 which depicts a determination of whether or not the threshold within the storage subsystem memory 50 has been exceeded. If so, the process passes to block 94, which illustrates the generation of an attention signal, indicating that portions of datasets within the storage subsystem memory 50 are ready to be copied by the processor. Of course, those skilled in the art will appreciate that a failure to copy data from the storage subsystem memory 50 may result in the corruption of the backup copy if that memory is overwritten. Referring again to block 92, in the event the threshold within the storage subsystem memory 50 has not been exceeded, the process returns again to block 74 to await the occurrence of the next update.

Figure 6:
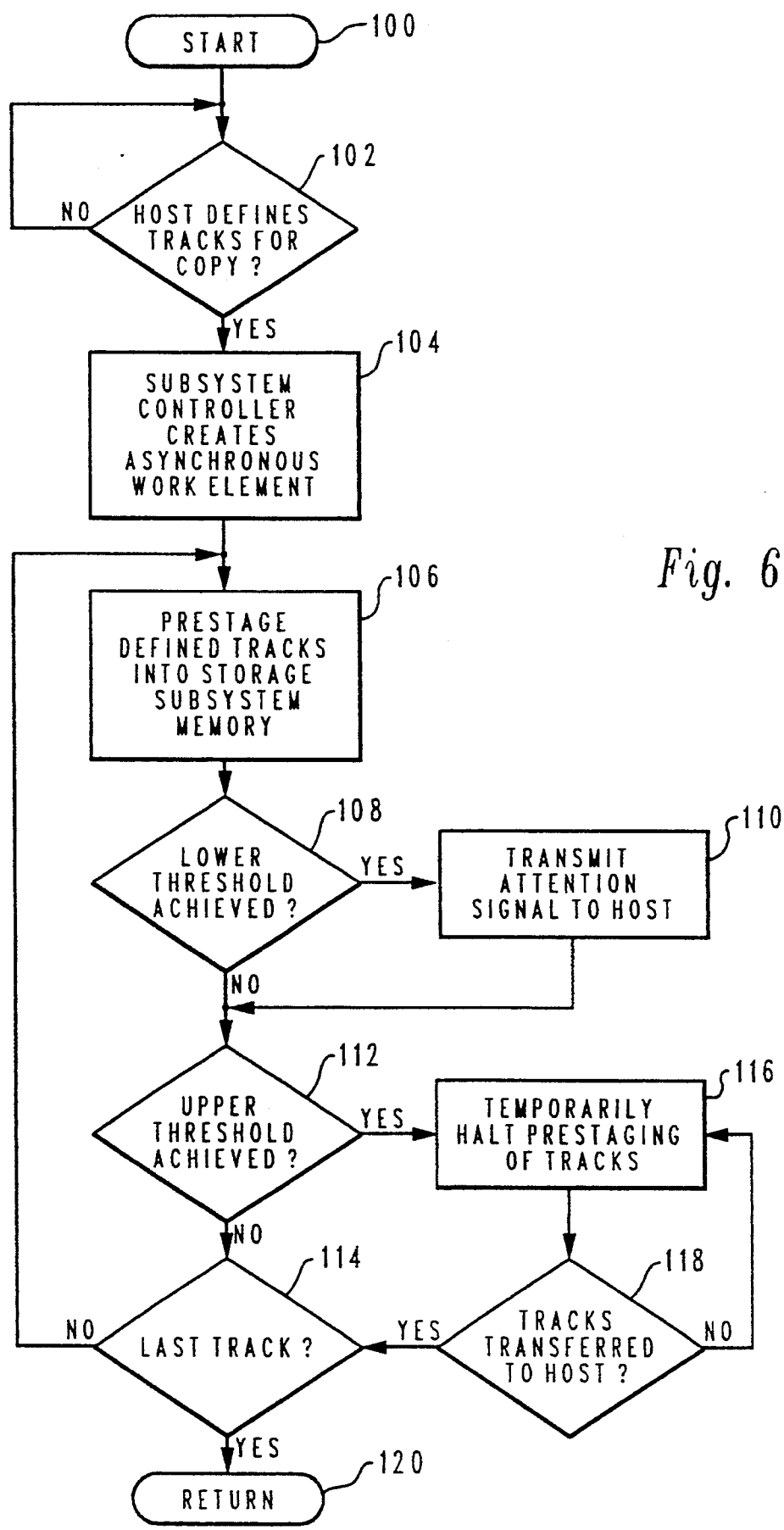
FIG. 6 is a high level logic flowchart illustrating the method and system for transferring a backup copy to the host system in accordance with the method and system of the present invention.

Finally, with reference to FIG. 6, there is depicted a high level flowchart illustrating the method and system for transferring a backup copy of designated datasets to the host system in accordance with the method and system of the present invention. As illustrated, the process begins at block 100 and thereafter passes to block 102. Block 102 illustrates the definition by the host of the tracks which are to be copied. Utilizing this technique, a command from the host will be utilized to define not only the number of tracks to be copied but also the order in which the host desires the copies be presented. If such a command is not received from the host and the host has not therefore defined designated datasets for copying, the process merely iterates until such time as the command defining the tracks for copy has been received.

In the event a command from the host defining tracks for copy is received, as determined at block 102, the process passes to block 104. Block 104 illustrates the creation of an asynchronous work element by the subsystem controller. This asynchronous work element will initiate internal processing necessary to stage tracks from tracked cyclic storage device 44 (see FIG. 4) into subsystem memory so that transfer of this data to the host may occur at maximum channel data rates rather than be limited to device data rates. By utilizing an asynchronous work element this pre-staging process may occur in the "background," allowing complete access to the storage device during backup copying by simply delaying the pre-staging process.

Next, block 106 illustrates the pre-staging of defined tracks from tracked cyclic storage device 44 (see FIG. 4) into storage subsystem memory. Thereafter, the process passes to block 108 which illustrates a determination of whether or not a lower threshold within storage subsystem memory has been achieved. If so, as described above, an attention signal is transmitted to the host, as depicted at block 110. This attention signal advises the host that data is pre-staged within storage subsystem memory and ready for transfer. By utilizing this technique, the host will not attempt to transfer data prior to successful pre-staging of some portion of that data and the efficiency of data transfer may be greatly enhanced.

After transmitting an attention signal to the host, as depicted at block 110, or after determining that the lower threshold within storage system memory has not been achieved, the process passes to block 112. Block 112 illustrates a determination of whether or not an upper threshold within storage subsystem memory has been achieved. Those skilled in the art will appreciate that if data is pre-staged into storage subsystem memory without the removal of that data by the host the possibility of corruption of that data as a result of overwriting may occur. Thus, if the upper threshold within storage subsystem memory is achieved, as determined at block 112, the process passes to block 116. Block 116 illustrates the temporary halting of the pre-staging of tracks within storage subsystem memory. Thereafter, the process passes to block 118. Block 118 illustrates a determination of whether or not tracks within storage subsystem memory have been transferred to the host and if not, the process merely iterates back to block 116, continuing to halt the pre-staging of tracks within storage subsystem memory until such time as tracks have been transferred from storage subsystem memory to the host. Of course, those skilled in the art will appreciate that ideally data tracks will be uploaded to the host at each available opportunity, preferably maintaining the number of tracks within subsystem memory at a level between the lower threshold and the upper threshold.

Referring again to block 112, in the event the staging of defined tracks into storage subsystem memory does not achieve the upper threshold within that memory the process passes from block 112 to block 114. Block 114 illustrates a determination of whether or not the track transferred into storage subsystem memory is the last track within the defined extent for this copy session and if not, the process returns to block 106 in an iterative fashion. However, in the event the track transferred into storage subsystem memory is the last track the process passes to block 120 and returns.

Referring again to block 118, in the event the pre-staging of tracks into storage subsystem memory has been halted, as illustrated at block 116, and those tracks are eventually transferred from storage subsystem memory to the host via the data channel, the process then passes from block 118 to block 114 for a determination of whether or not the most recent track transferred into the storage subsystem memory is the last track within the defined extent. As described above, if the track most recently transferred into storage subsystem memory is not the last track the process iterates and returns to block 106.

Upon reference to the foregoing those skilled in the art will appreciate that the Applicants herein have created a system whereby the efficiency of transferring backup copies of designated datasets within a storage subsystem may be greatly enhanced by pre-staging that data into storage subsystem memory and coordinating the retrieval of that data from storage subsystem memory by the host utilizing the threshold signals described herein. By performing this pre-staging and coordinating the retrieval of that data by the host system data transferred from a storage subsystem to the host may be transferred at the maximum permitted data rate for the data channel being utilized, rather than being limited to the maximum data rate permitted for a particular storage device.

While the invention has been particularly shown and described with reference to a preferred embodiment, it will be understood by those skilled in the art that various changes in form and detail may be made therein without departing from the spirit and scope of the invention.

We claim:

1. A method in a data processing system for transferring a backup copy of designated datasets stored in a plurality of storage subsystems to a host system via a data channel during concurrent execution of an application wherein each of said storage subsystems include storage subsystem memory associated therewith, said method comprising the steps of:

suspending execution of said application in response to a request for generating a backup copy;

forming a dataset logical-to-physical storage subsystem address concordance for said designated datasets;

resuming execution of said application upon completion of said forming of said address concordance;

processing any application initiated updates to affected portions of said designated datasets which occur prior to generation of a backup copy of said affected portions of said designated datasets by buffering said updates, copying said affected portions of said designated datasets to said storage subsystem memory, updating said address concordance in response to said copying, and writing said updates to said affected portions of said designated datasets within said plurality of storage subsystems;

copying all remaining portions of said designated datasets on an asynchronous basis from said plurality of storage subsystems to said storage subsystem memory and updating said address concordance in response to said copying; and transferring portions of said designated datasets from said storage subsystem memory to said host system upon the occurrence of an attention signal wherein said attention signal occurs when a number of portions of said designated datasets stored in said storage subsystem memory achieves a defined threshold number wherein the efficiency of transferring said backup copy is enhanced.

2. The method in a data processing system for transferring a backup copy of designated datasets stored in a plurality of storage subsystem to a host system via a data channel according to claim 1, wherein said step of copying all remaining portions of said designated datasets on an asynchronous basis from said plurality of storage subsystems occurs in response to a receipt of a command from said host system at said storage subsystem.

3. The method in a data processing system for transferring a backup copy of designated datasets stored in a plurality of storage subsystem to a host system via a data channel according to claim 1, further including the step of temporarily terminating said copying of all remaining portions of said designated datasets from said plurality of storage subsystems to said storage subsystem memory in response to a number of portions of said designated datasets stored in said storage subsystem memory achieving a second defined threshold number.

4. The method in a data processing system for transferring a backup copy of designated datasets stored in a plurality of storage subsystems to a host system via a data channel according to claim 1, further including the step of temporarily terminating said copying of all remaining portions of said designated datasets from said plurality of storage subsystems to said storage subsystem memory in response to a data request within said storage subsystem.

5. A data processing system for transferring a backup copy of designated datasets stored in a plurality of storage subsystems to a host system via a data channel during concurrent execution of an application wherein each of said storage subsystems include storage subsystem memory associated therewith, said data processing system comprising the steps of:

means for suspending execution of said application in response to a request for generating a backup copy;

means for forming a dataset logical-to-physical storage subsystem address concordance for said designated datasets;

means for resuming execution of said application upon completion of said forming of said address concordance;

means for processing any application initiated updates to affected portions of said designated datasets which occur prior to generation of a backup copy of said affected portions of said designated datasets by buffering said updates, copying said affected portions of said designated datasets to said storage subsystem memory, updating said address concordance in response to said copying, and writing said updates to said affected portions of said designated datasets within said plurality of storage subsystems;

means for copying all remaining portions of said designated datasets on an asynchronous basis from said plurality of storage subsystems to said storage subsystem memory and updating said address concordance in response to said copying; and means for transferring portions of said designated datasets from said storage subsystem memory to said host system upon the occurrence of an attention signal wherein said attention signal occurs when a number of portions of said designated datasets stored in said storage subsystem memory achieves a defined threshold number wherein the efficiency of transferring said backup copy is enhanced.

6. The data processing system for transferring a backup copy of designated datasets stored in a plurality of storage subsystems to a host system via a data channel according to claim 5, wherein said means for copying all remaining portions of said designated datasets on an asynchronous basis from said plurality of storage subsystems to said storage subsystem memory includes means for copying all remaining portions of said designated datasets on an asynchronous basis from said plurality of storage subsystems to said storage subsystem memory in response to a command from said host system.

7. The data processing system for transferring a backup copy of designated datasets stored in a plurality of storage subsystems to a host system via a data channel according to claim 5, further including means for temporarily terminating said copying of all remaining portions of said designated datasets on an asynchronous basis from said plurality of storage subsystems to said storage subsystem memory in response to a number of portions of said designated dataset stored in said storage subsystem memory achieving a second defined threshold number.

8. The data processing system for transferring a backup copy of designated datasets stored in a plurality of storage subsystems to a host system via a data channel according to claim 5, further including means for temporarily terminating said copying of all remaining portions of said designated datasets on an asynchronous basis from said plurality of storage subsystems to said storage subsystem memory in response to a request for data within said storage subsystem.

* * * * *